US008432397B2

(12) United States Patent
Kishimoto et al.

(10) Patent No.: US 8,432,397 B2
(45) Date of Patent: Apr. 30, 2013

(54) DATA DISPLAY APPARATUS FOR DISPLAYING MEASUREMENT DATA IN A TIME SERIAL MANNER

(75) Inventors: Yuka Kishimoto, Hyogo (JP); Taketomo Amie, Hyogo (JP)

(73) Assignee: Fujitsu Ten Limited, Kobe-Shi (JP)

( * ) Notice: Subject to any disclaimer, the term of this patent is extended or adjusted under 35 U.S.C. 154(b) by 842 days.

(21) Appl. No.: 12/078,439

(22) Filed: Mar. 31, 2008

(65) Prior Publication Data

US 2008/0273036 A1 Nov. 6, 2008

(30) Foreign Application Priority Data

Mar. 30, 2007 (JP) ............................... P2007-095222

(51) Int. Cl.
*G06T 11/20* (2006.01)

(52) U.S. Cl.
USPC ........................................................ 345/440

(58) Field of Classification Search ........................ None
See application file for complete search history.

(56) References Cited

U.S. PATENT DOCUMENTS

| | | | | |
|---|---|---|---|---|
| 4,862,150 | A * | 8/1989 | Katsura et al. | 345/600 |
| H1506 | H * | 12/1995 | Beretta | 345/591 |
| 7,589,727 | B2 * | 9/2009 | Haeker | 345/440 |
| 2004/0164983 | A1 * | 8/2004 | Khozai | 345/440 |

FOREIGN PATENT DOCUMENTS

| | | |
|---|---|---|
| JP | A-01-147321 | 6/1989 |
| JP | A-04-031768 | 2/1992 |
| JP | A-05-046156 | 2/1993 |
| JP | A-08-136029 | 5/1996 |
| JP | A-08-161387 | 6/1996 |
| JP | A-10-010962 | 1/1998 |
| JP | A-11-326135 | 11/1999 |
| JP | B2-3006032 | 2/2000 |
| JP | A-2002-131339 | 5/2002 |

* cited by examiner

*Primary Examiner* — Ulka Chauhan
*Assistant Examiner* — Patrick F Valdez
(74) *Attorney, Agent, or Firm* — Oliff & Berridge, PLC

(57) ABSTRACT

A plurality of types of measurement data which are measured by a signal measurement section in a time serial manner are displayed on a predetermined coordinate system. A data type assignment section is operable to assign the types of the measurement data to different coordinate axes in the predetermined coordinate system, respectively. A plotting processing section is operable to plot characteristic values on the predetermined coordinate system, the characteristic values specified by the measurement data synchronized at a measurement timing from the measurement data belonging to the types.

12 Claims, 8 Drawing Sheets

DATA DISPLAY APPARATUS FOR DISPLAYING MEASUREMENT DATA IN A TIME SERIAL MANNER

The disclosure of Japanese Patent Application No. 2007-095222 filed on Mar. 30, 2007 including specification, drawings and claims is incorporated herein by reference in its entirety.

BACKGROUND

The present invention relates to a data display apparatus that displays a plurality of types of measurement data measured in a time serial manner by a signal measurement section on a predetermined coordinate system.

Recently, simulation devices are used in various fields for the purpose of reducing time or cost needed for developing products or the like and preliminarily verifying safety of the products; or for the purpose of conducting simulation-based training for operating an actual plant. According to the simulation devices, a computer calculates models that formulate the functions of mechanisms or electrical signals in actual products or plants, and the characteristics of the product or the like are identified based on the calculation results, thereby preliminarily resolving possible problems or getting trained for the problems.

As an example of such simulation devices, Patent Document 1 discloses a simulation device for monitoring the operation of an engine control unit of a vehicle and evaluating the performance by creating an imaginary environment in which an engine control unit for a vehicle is mounted on an actual vehicle. The simulation device includes a model computer unit that is operated as a vehicle model corresponding to an imaginary vehicle in accordance with preset program and that generates simulation signals corresponding to each engine excursion and each crank angle and gives the simulation signals to the engine control unit of the vehicle, thereby monitoring the operation and evaluating the performance. The simulation device also includes a signal generation unit that is operated in cooperation with the model computer unit and that generates signals necessary for the vehicle model of the model computer unit.

The simulation device is also provided with a signal measurement section that measures time-serial control signals such as fuel injection pulses or ignition pulses output from the engine control unit in response to simulated crank pulse signals output to the engine control unit from a simulation calculation section that simulates an engine and a data display apparatus that displays a plurality of types of measurement data measured by the signal measurement section on a predetermined coordinate system. With this arrangement, an operator can have a view of the measurement data displayed on a monitor and determine whether the engine control unit is operating properly.

Patent Document 1: Japanese Patent Publication No. 11-326135A

However, according to the data display apparatus disclosed in Patent Document 1, a plotting processing section plots the measurement data measured in a time serial manner by the signal measurement section on a two-dimensional coordinate system wherein X and Y axes are fixed to time and signal values and output the plot results to an output unit such as a monitor. Therefore, it is difficult to evaluate the correlation between plural related signals.

In order to solve the problem and enable evaluation of correlation between specific measurement data, separate plotting processing programs may be constructed, which, however, require specific-purpose program developments. Thus, it is difficult to flexibly evaluate the correlation between arbitrary measurement data.

Therefore, when evaluating the correlation between present measurement data and ideal model data or measurement data that were sampled in the past, it is necessary to print the measurement data on a recording sheet for precise investigation, which may complicate the evaluation work.

SUMMARY

It is therefore an object of the present invention to provide a data display apparatus enabling efficient evaluation of the mutual correlation between a plurality of types of measurement data measured in a time serial manner by a signal calculation section.

In order to attain the object, according an embodiment of the present invention, there is provided data display apparatus for displaying a plurality of types of measurement data which are measured by a signal measurement section in a time serial manner on a predetermined coordinate system, the data display apparatus, comprising: a data type assignment section operable to assign the types of the measurement data to different coordinate axes in the predetermined coordinate system, respectively; and a plotting processing section operable to plot characteristic values on the predetermined coordinate system, the characteristic values specified by the measurement data synchronized at a measurement timing from the measurement data belonging to the types.

With the above configuration, a coordinate system can be constructed flexible for arbitrary measurement data between which a user wishes to evaluate the correlation, whereby the measurement data are displayed on the coordinate system.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE EMBODIMENTS

Figure 1:
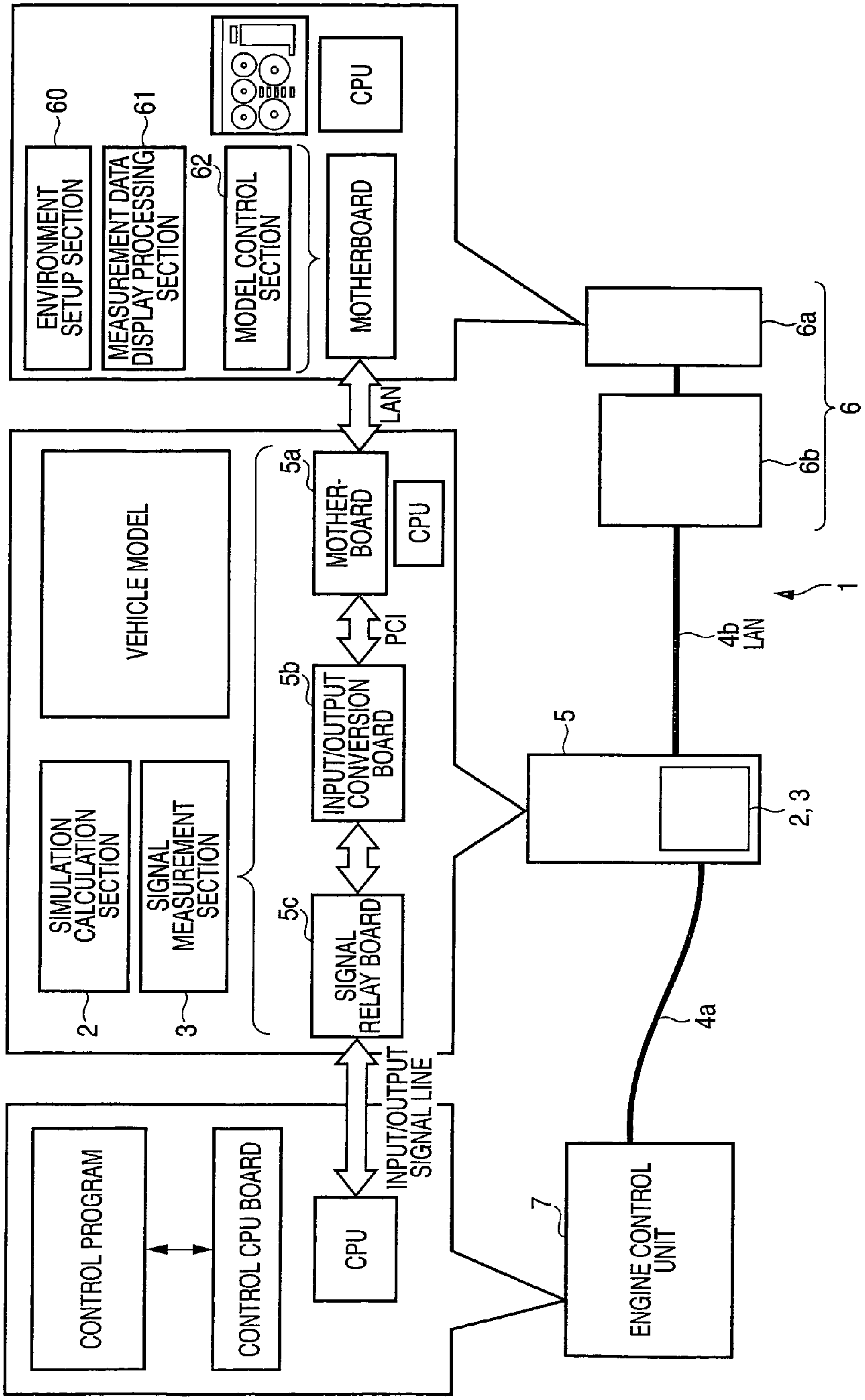
FIG. 1 is a hardware configuration diagram of a simulation device having mounted thereon a data display apparatus according to the present invention.
Figure 2:
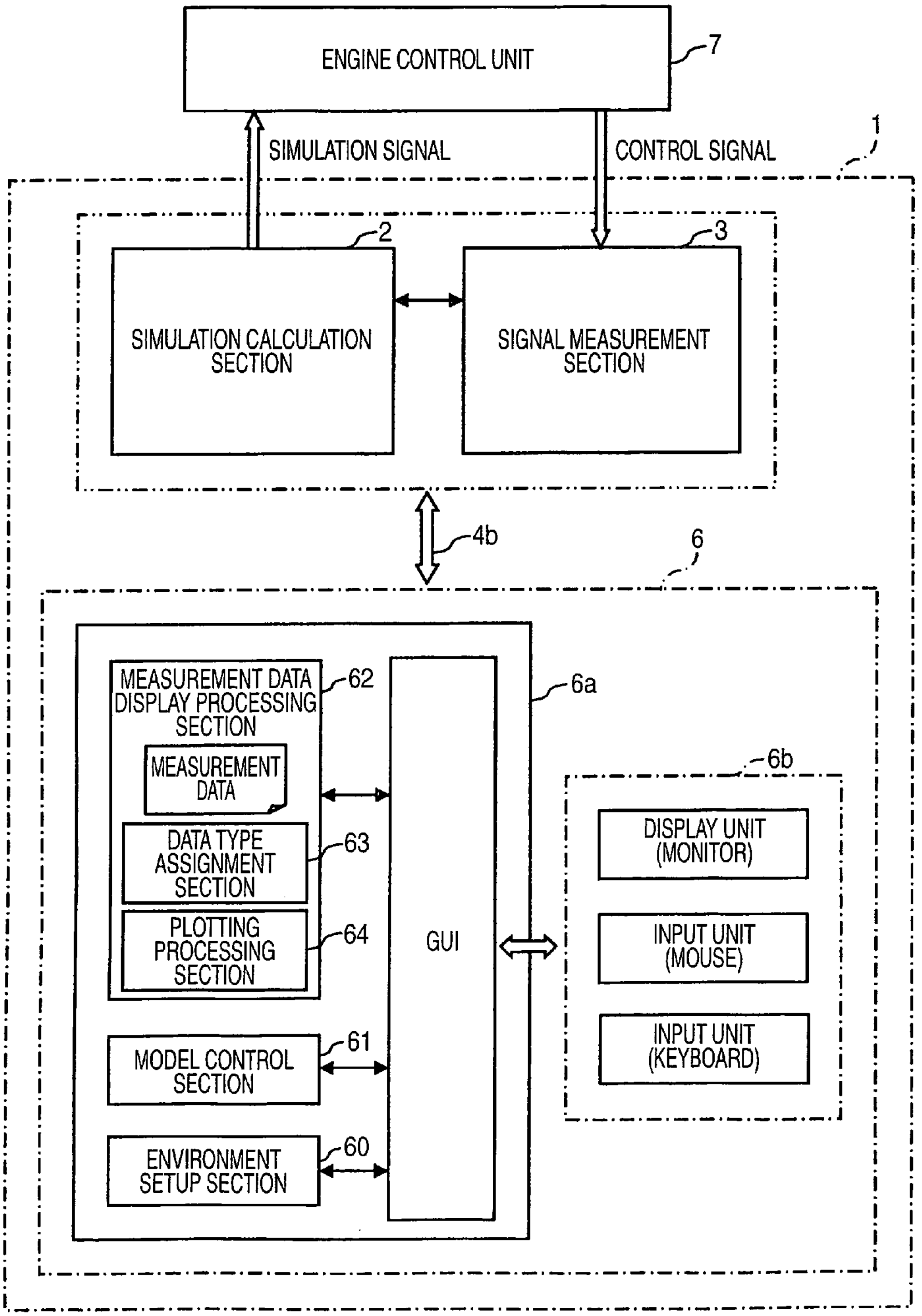
FIG. 2 is a function block diagram of the simulation device having mounted thereon the data display apparatus according to the present invention.

Hereinafter, a simulation device having mounted thereon a data display apparatus according to the present invention will be described. As shown in FIGS. 1 and 2, the simulation device 1 is a device for evaluating an engine control unit 7 mounted on a vehicle. The simulation device 1 is configured to include a simulation calculation section 2 that simulates an engine operation and outputs a simulation signal to an engine control unit (hereinafter, simply "control unit") 7, a signal measurement section 3 that measures the simulation signal and a control signal input from the control unit 7 in response to the simulation signal and outputs measurement data of the control signal, and an operation unit 6 functioning as a data display apparatus that controls the operations of the simulation calculation section 2 and the signal measurement section 3 based on an operation of an operator and monitors and displays the simulation signal or the control signal based on the measurement data input from the signal measurement section 3.

The simulation calculation section 2 and the signal measurement section 3 are constructed by a plurality of signal processing boards mounted on a rack 5. The operation unit 6 is constructed by a personal computer 6*a* or the like. The above sections and unit are connected by a LAN (Ethernet; a registered trademark of Xerox Corporation) 4*b* so that they can communicate with each other at a predetermined time interval.

The operation unit 6 has installed therein an simulation program for operation and display that operates under a predetermined operating system (hereinafter, simply "OS") and is configured to receive operations input by an operator via a graphic user interface (GUI) integrated into the OS. The operation unit 6 is connected to an input/output device 6*b* such as a keyboard, a mouse or a monitor for displaying the simulation results.

By the execution of the simulation program, an environment setup section 60, a measurement data display processing section 61, and a model control section 62 are constructed. The environment setup section 60 is for setting up simulation environment conditions such as definition information of an input/output signal communicated between the simulation device 1 and the control unit 7, model calculation conditions in the simulation calculation section 2, or signal measurement conditions in the signal measurement section 3. The measurement data display processing section 61 is for receiving the measurement data output from the signal measurement section 3 to display the measurement data on a monitor. The model control section 62 is for controlling the operations of the simulation calculation section 2 and the signal measurement section 3. That is, the data display apparatus of the present invention is implemented by the measurement data display processing section 61.

The measurement data display processing section 61 is configured to include a data type assignment section 63 that assigns the plural data types of the measurement data measured in a time serial manner by the signal measurement section 3 to different coordinate axes of a single coordinate system and a plotting processing section 64 that plots characteristic values specified by the measurement data synchronized at a measurement timing from the measurement data belonging to each data type. The plotting processing section 64 has a curve generating section that generates a curve by connecting the characteristic values.

The signal processing boards described above include a motherboard 5*a* having mounted thereon a main CPU, a plurality of input/output conversion boards 5*b* connected to the motherboard 5*a* via a PCI bus, and a plurality of signal relay boards 5*c* for relaying input/output signal lines for communication between the input/output conversion boards 5*b* and the control unit 7. The signal processing boards are connected to the control unit 7 via the signal relay boards 5*c* by section of a harness 4*a*.

A memory mounted on the motherboard 5*a* stores therein an OS and a simulation program that is operated based on the OS. When the simulation program is executed under the OS, the motherboard 5*a*, the input/output conversion boards 5*b*, and the signal relay boards 5*c* are operated, whereby the simulation calculation section 2 and the signal measurement section 3 described above are constructed.

In the motherboard 5*a*, a model program which is a part of the simulation program, for simulating an engine operation is executed, and logical simulation signal data such as "presence of output," "size," or "frequency" of various simulation signals output from the engine control unit 7 are generated and output to the input/output conversion boards 5*b* via the PCI bus. That is, the model program is a program for executing predetermined calculation based on input data to generate and output predetermined output data. For example, when the number of revolutions of an engine is input, the program converts the number of revolutions into a crank pulse signal to output pulse frequency data corresponding to the number of revolutions; meanwhile, when throttle operation data are input, the program outputs corresponding throttle opening data.

The input/output conversion boards 5*b* have mounted thereon an FPGA, which is a programmable logic circuit, and a physical simulation signal is generated based on the simulation signal data input to a register of the FPGA. For example, when simulating a crank pulse signal output from an engine to output a simulated crank pulse signal, logical simulation signal data such as "presence of output," "size," or "frequency" of the simulated crank pulse are generated in the motherboard 5*a* based on data input from the operation unit 6, the data regarding the number of revolutions. Then, in the motherboard 5*b*, by a pulse generation circuit or the like, a corresponding pulse signal is generated and output to the signal relay boards 5*c*.

The signal relay boards 5*c* are provided with an interface switching section that separately switches the relay state—that is, a signal form such as a signal path, a voltage level or impedance—of the input/output signals between the control unit 7 and the signal relay boards 5*c*. Therefore, the simulated crank pulses input from the input/output conversion boards 5*b* are passed through a preset signal path and output with a voltage level, impedance and the like matched to the control unit 7. In order for this, the interface switching section is provided with a switch circuit for switching and setting a signal path, a level switching circuit for switching a signal level, a switching circuit for pulling up or pulling down the signal, or the like.

The control signal output from the control unit 7 is processed by the signal relay boards 5*c* for matching of the voltage level, impedance, or the like and output to the input/output conversion boards 5*b* through a preset signal path. The control signal is measured by a signal detection circuit including a clock circuit, a counter circuit, a pulse detection circuit, and an AD conversion circuit provided in the input/output conversion boards 5*b*, whereby measurement data—that is, logical measurement data such as "presence of output," "size," "frequency," or "pulse width" are generated. The signal relay boards 5*c* receive the simulation signal generated in the motherboard as logical measurement data. When the simulation signal generated in the motherboard is input as the measurement data, it may be configured such that the simulation signal is directly written in a memory (described later) on the motherboard without via the input/output conversion boards 5*b*. However, in this case, it is necessary to synchronize the measurement timing between the simulation signal and the control signal output from the control unit 7.

The measurement data generated in the input/output conversion boards 5*b* are buffered in a memory on the FPGA and output to the motherboard 5*a* via a PCI bus. In the motherboard 5*a*, the measurement data input from the input/output conversion boards 5*b* are stored in a memory and output to the operation unit 6 via a LAN at a predetermined frequency.

In the operation unit 6, the measurement data input from the motherboard 5*a* are stored in a data storage section, and sections of the measurement data corresponding to the control signal are displayed as a trend graph on a monitor based on the stored measurement data. With this arrangement, an operator can have a view of the trend graph.

The term, definition information of the input/output signal described above, refers to the definition information of the signal form and the path information in the signal relay boards 5*c* or the definition information of data communicated between the operation unit 6 and the simulation calculation section 2 or the signal measurement section 3. The term, model calculation conditions refer to input/output conditions on model calculation of the above-described data regarding the number of revolutions of an engine or the like. The term, signal measurement conditions refer to a measurement object and a sampling timing of the control signal input from the control unit 7 and the definition information of the generated measurement data.

Once the environment setup information is transmitted from the environment setup section 60 to the respective boards 5*b* and 5*c* via the motherboard 5*a* based on an operation input of an operator and the simulation environment is set up, simulation is executed by the control of the model control unit 6*c* and the data measured at this instance are processed for display by the measurement data display processing section 6*b*.

Hereinafter, as an example of the operations of the above-described simulation device 1, operations of measuring a crank pulse signal, which is a simulation signal output from the simulation calculation section 2 to the control unit 7 or various control signals output from the control unit 7 by the signal measurement section and displaying the measured signals on the operation unit 6 will be described with reference to the flow charts of FIGS. 3 and 4.

Figure 3:
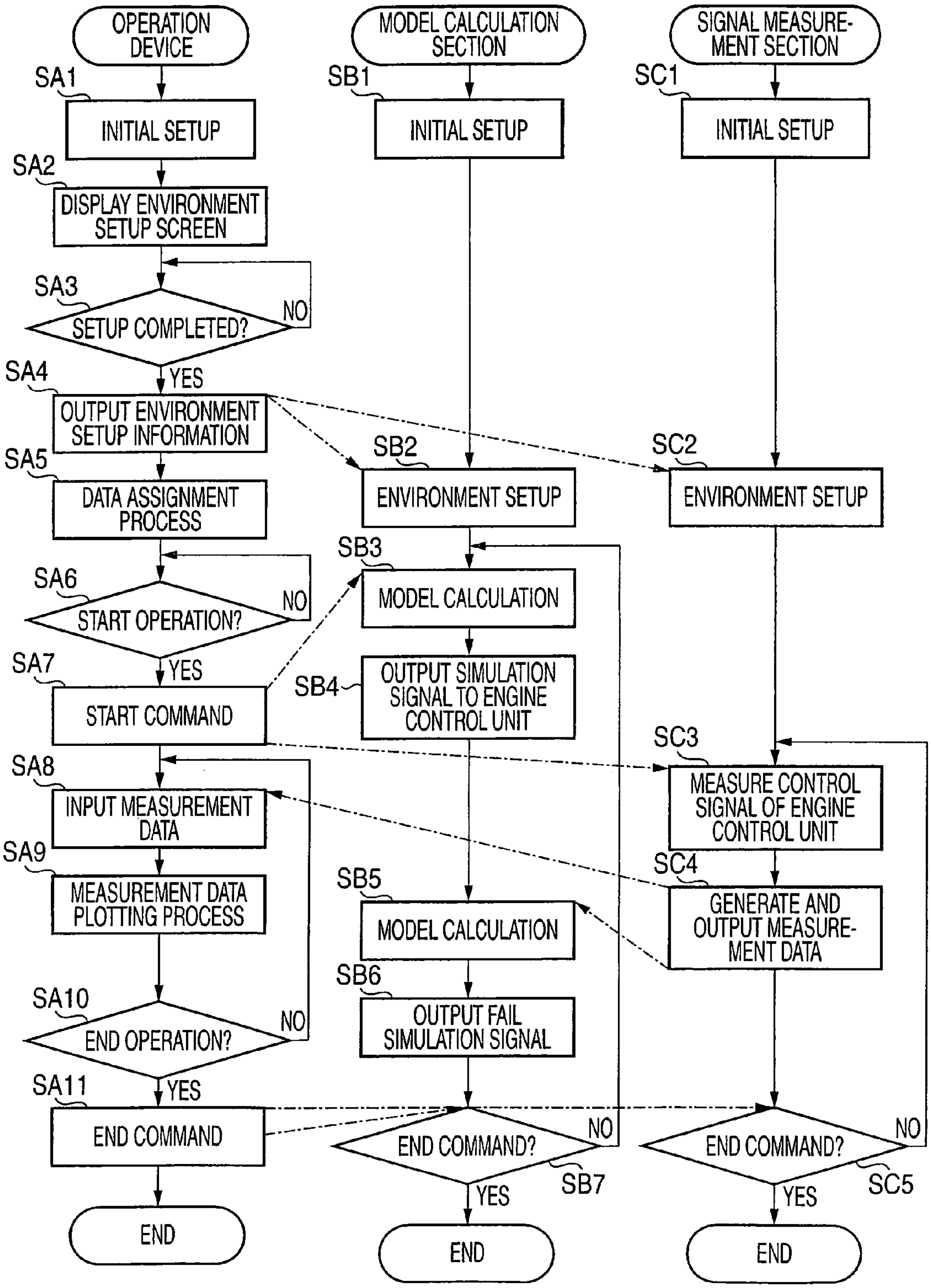
FIG. 3 is a flow chart illustrating a simulation operation.

As shown in FIG. 3, when the simulation device 1 is powered on, an OS is activated to perform an initial setup and a simulation program, which is an application program, is activated (SA1, SB1, and SC1). Then, an environment setup screen is displayed on a display section of the operation unit 6 by the environment setup section 60 (SA2) and the above-described environment setup is performed by an operator.

When the setup is completed (SA3), the completed environment setup information is transmitted from the operation unit 6 to the simulation calculation section 2 and the signal measurement section 3 via the LAN 4*b* (SA4). In the simulation calculation section 2, a calculation environment is set up based on the model calculation conditions and the definition information of the input/output signals; meanwhile, in the signal measurement section 3, a measurement environment is set up based on the signal measurement conditions and the definition information of the input/output signals (SB2 and SC2).

Next, a registration screen of measurement data display items is displayed on the display section of the operation unit 6 by the data type assignment section 63, and by the operator's operation, selection of a coordinate system for displaying the measurement data and a data assignment process are performed (SA4).

More specifically, the registration screen displays a plurality of display objects for displaying simulation results including a time coordinate graph wherein an X axis represents a time and a Y axis represents measurement data, an X-Y, two-dimensional coordinate graph wherein each axis is not defined, and a diagrammatic graph for graphically displaying the number of revolutions or a vehicle speed.

Figure 4A:
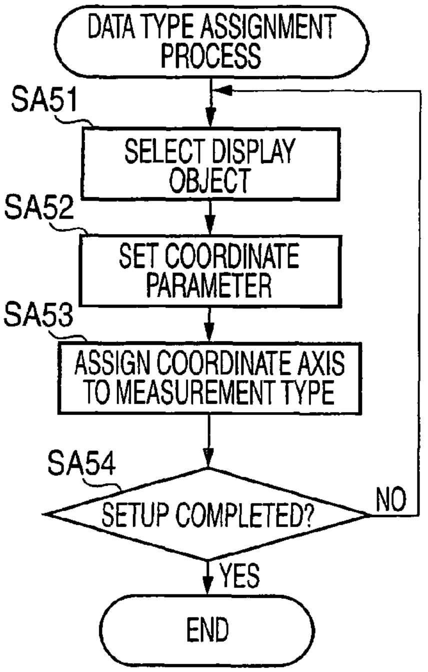
FIG. 4 is a flow chart illustrating a main part of the simulation operation.
Figure 5A:
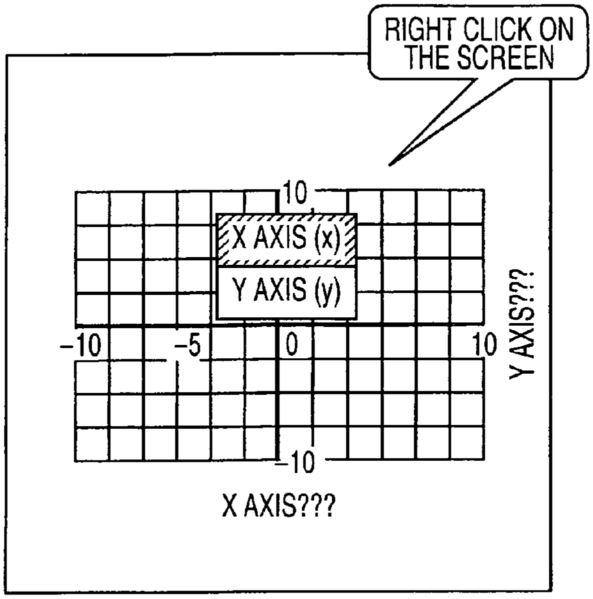
FIG. 5 is an explanatory diagram of a data type assignment process.

Hereinafter, a display object selection process will be described by way of example of an X-Y, two-dimensional coordinate graph. As shown in FIG. 4A, when an X-Y, two-dimensional coordinate graph is selected by an operator (SA51), a undefined, coordinate window as shown in FIG. 5A is displayed, where when an operator right-clicks a mouse on the window, a popup menu is displayed. As the popup menu, a parameter setting menu, a coordinate axis assignment menu or the like is displayed; for example, when the parameter setting menu is selected by a mouse, a parameter setting window is displayed with a plurality of parameter setting tabs.

The parameter setting tabs include a coordinate system display form setting tab for setting a line type or a line color of the coordinate system; a range setting tab for setting the range, minimum, maximum, memory width of the coordinate axes; a data display form setting tab for selecting whether the plot data will be represented by a line or dots and setting a display color or gradation of the line or dots; a number of display data setting tab for setting the number of data to be displayed on the coordinate system; and an update frequency setting tab for setting an update frequency of the plotting. By selecting each tab to set the respective parameters, a display form of the coordinate system is set (SA52).

Figure 5B:
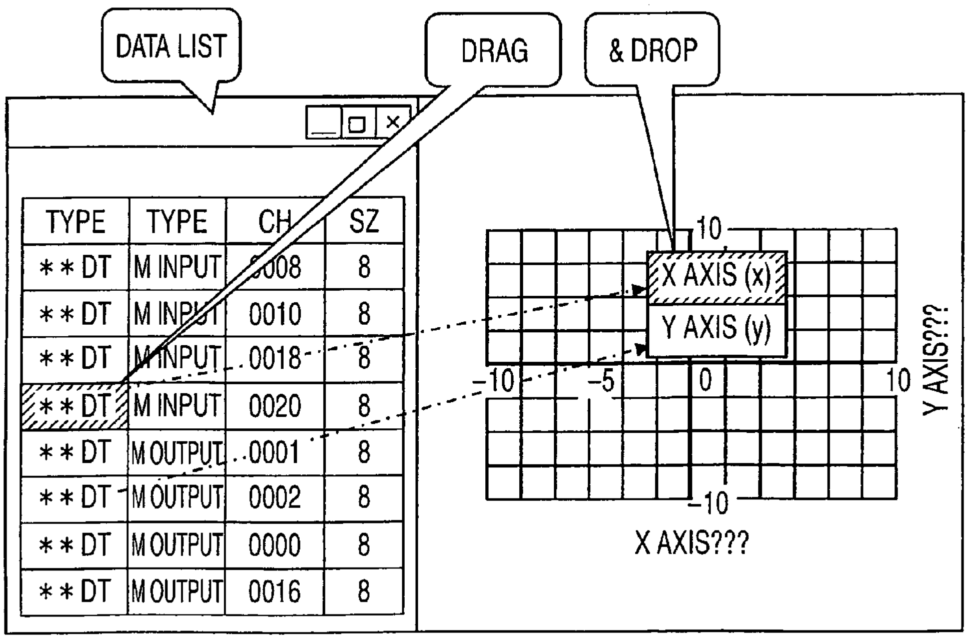

When the coordinate axis assignment menu is selected by a mouse, as shown in FIG. 5B, a data list window is displayed adjacent to the coordinate window. On the data list window, a data type of the measurement data, a data attribute, a channel number (path information) of the measurement data and a size (in units of byte) of the measurement data are displayed.

When an operator moves a mouse pointer to a display area of a data type column to be assigned to the X and Y axes and drag-and-drops the data type column to any one display area of the X and Y axis icons displayed on the center of the coordinate window, the measurement data of a type belonging to the data type column are assigned to the X axis or the Y axis (SA53).

In order for this, the data type assignment section 63 includes a list display section for displaying a list of plural data types. The data type assignment section is configured to assign the data type selected by a pointing device from the displayed data type list to a coordinate axis selected by the pointing device.

For example, when one of the data types is selected and assigned to the X axis by the data type assignment section 63, the list display section displays a list of data types which are correlated with the data type assigned to X axis, as candidate types for the Y axis. In order for this, the data types, a correlation between which are required to be investigated, are correlated with each other by link information, so that only the data types correlated with the one of the data types, which is assigned to the X axis are displayed for selection when the data type is assigned to the X axis. Accordingly, an operator can smoothly perform an assignment operation.

When by the operation of an operator, a number of X-Y, two-dimensional coordinate graphs that need displaying are defined and the above-described time coordinate graph or a diagrammatic graph is defined (SA54), the data assignment process of Step SA5 ends.

When an operator starts the simulation (SA6), a simulation start command is transmitted by the model control unit 62 from the operation unit 6 to the simulation calculation section 2 and the signal measurement section 3 (SA7). In the simulation calculation section 2, a model calculation of an engine is activated (SB3) and a simulation crank pulse is output to the control unit 7 based on the set calculation conditions (SB4).

In the signal measurement section 3, the simulation signal output from the simulation calculation section 2 or the control signal output from the control unit 7 in response to the simulation signal is measured (SC3) and the generated measurement data are output to the simulation calculation section 2 and the operation unit 6 (SC4).

Once measurement data of an ignition signal or an injection signal, for example, are input in response to the simulation crank pulse, the simulation calculation section 2 generates a corresponding simulation fail signal for detection of an error by the control unit 7 (SB5) and outputs the simulation fail signal to the control unit 7 (SB6).

In the operation unit 6, once the measurement data are input (SA8), the X-Y, two-dimensional coordinate graph, the time coordinate graph, the diagrammatic graph, or the like are displayed on the display section by the plotting processing section 64 (SA9). In order for this, the plotting processing section 64 includes plotting area display section for displaying a plotting area having X and Y axes different from a time axis.

Figure 4B:
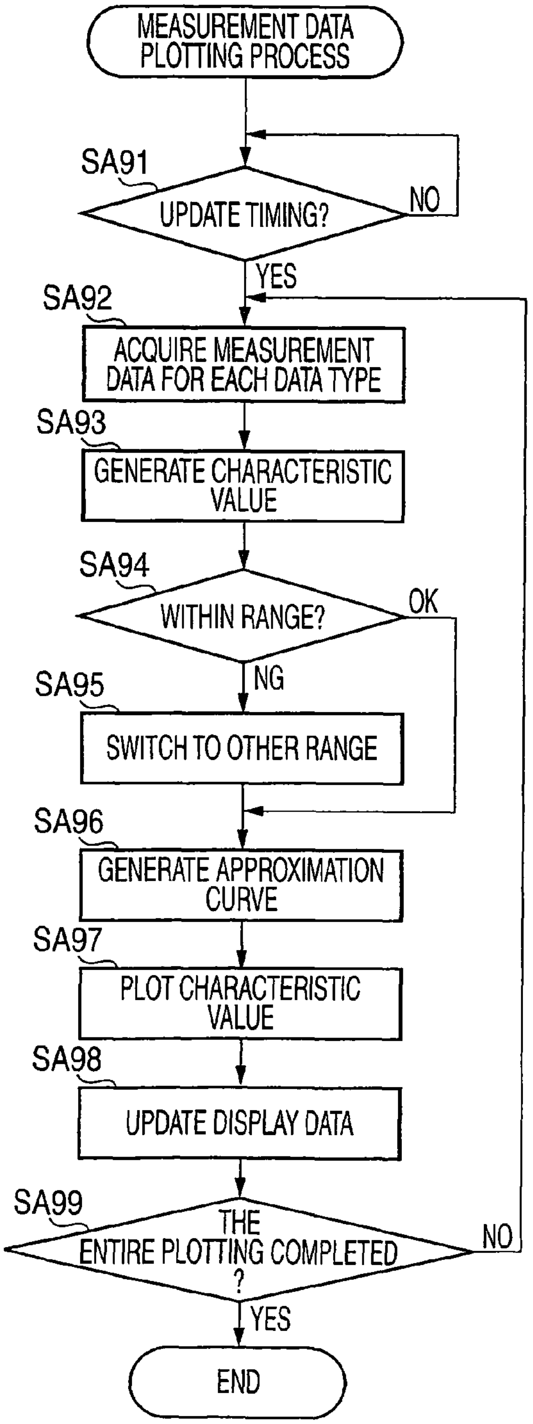

Details of the X-Y, two-dimensional coordinate graph will be described. As shown in FIG. 4B, the plotting processing section 64 functions as data display section and is configured to read respective measurement data synchronized at the nearest measurement timing among a plurality of measurement data stored in the data storage section and belonging to the data type defined on the respective XY coordinate systems at a display update timing (SA91) set in the update frequency setting tab (SA92) and plot the characteristic values as specified by the respective measurement data on the coordinate system using a graphic such as rounded dots, triangular dots, or a line (SA93).

Further, the plotting processing section 64 functions as timing chart display section and is configured to display a timing chart, which is a time coordinate graph wherein X and Y axes are assigned to time and measurement data, respectively. That is, a two-dimensional graph wherein one axis is assigned to time is referred to as a timing chart.

Figure 6A:
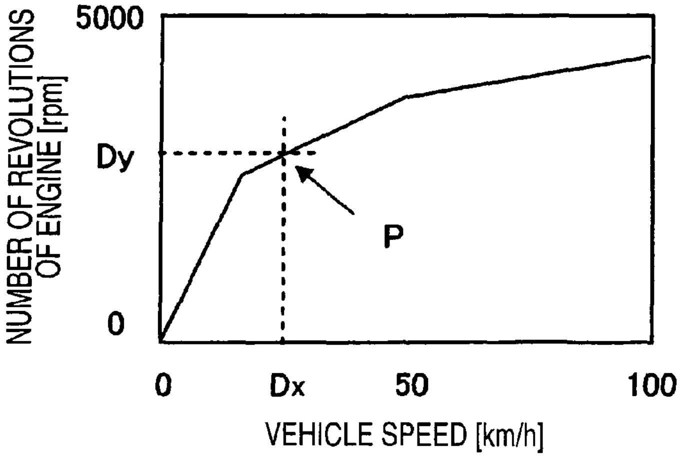
FIGS. 6A to 6C are explanatory diagrams of a coordinate system in which measurement data are plotted.

For example, as shown in FIG. 6A showing two measurement data of a vehicle speed and the number of revolutions of an engine, by plotting as a characteristic value, an intersection point P of perpendicular lines drawn onto each axis from the points representing the values of the respective data Dx and Dy measured at the same measurement timing, the X-Y, two-dimensional coordinate graph representing mutual correlation between the measurement data can be displayed. In is noted that the display update timing can be arbitrarily set; therefore, instead of displaying the measurement data synchronized at the nearest measurement timing, all the measurement data which have not been displayed after a previous display update timing may be read and displayed.

Figure 8A:
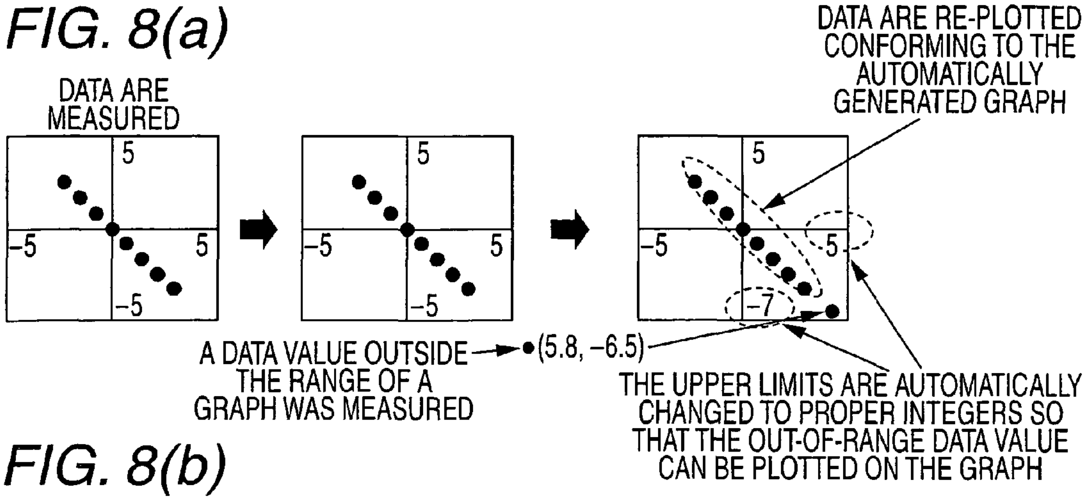
FIGS. 8A to 8C are explanatory diagrams showing a plotting pattern of the measurement data.

The plotting processing section 64 includes a range switching section that automatically switches a setting range so that when the characteristic value is out of the setting range of the coordinate system, the characteristic value can be plotted on the coordinate system. Specifically, when it is determined that a characteristic value to be plotted is out of an initial setting range (SA94), the range switching section displays the characteristic value on an X-Y, two-dimensional coordinate system wherein the range is automatically switched (SA95). The range switching by the range switching section is performed such that as shown in FIG. 8A, a minimum displayable unit of the characteristic value corresponds to the maximum value of the switched range. The automatic switching by the range switching section may be performed such that the maximum range is increased by the value corresponding to the deviation of the present characteristic value from a previous characteristic value.

Further, the plotting processing section 64 includes a curve generation section that connects the characteristic values to generate a smooth curve. The plotting processing section 64 is configured to update and render the curve generated by the curve generation section whenever a new characteristic value is plotted, thereby generating a new curve including past characteristic values whenever the new characteristic value is plotted (SA96). The curve is generated using a known spline function; however, the curve generation method is not limited to this. For example, an approximation curve obtained by calculating a curve so as to approximate closest to the points to which the characteristic values are plotted may be used.

Figure 7A:
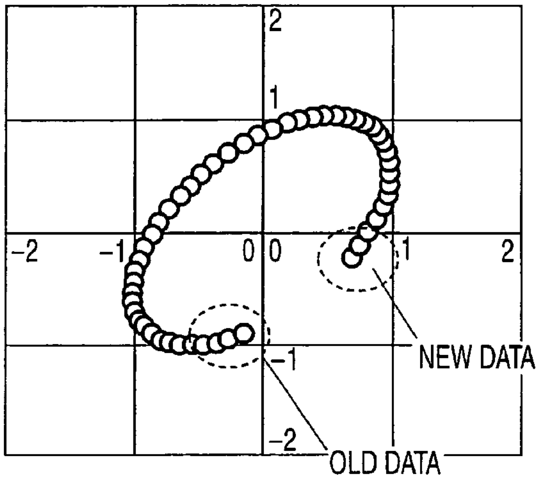
FIGS. 7A to 7C are explanatory diagrams showing a plotting pattern of the measurement data.
Figure 7B:
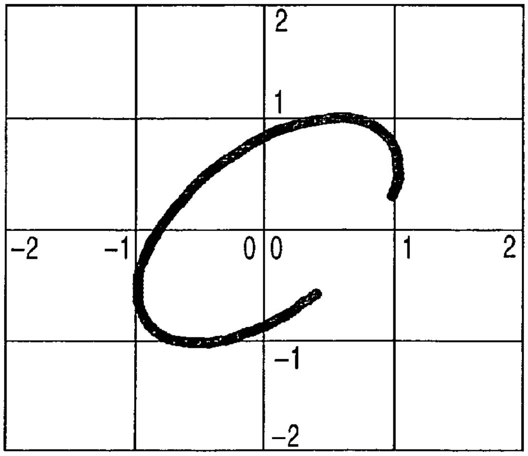
Figure 7C:
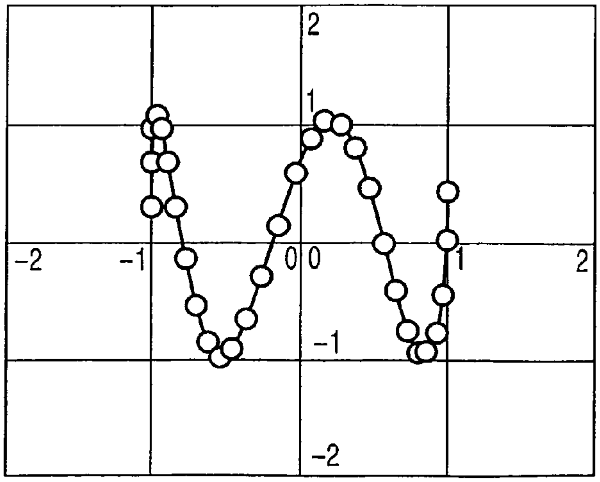

In this way, display data are updated by the curve based on the new characteristic values (SA97 and SA98). FIGS. 7A to 7C show a display pattern of the measurement data plotted on the X-Y, two-dimensional coordinate system by the plotting processing section 64. Specifically, FIG. 7A shows a display pattern when the data display form setting tab is set to plot the measurement data by dots. FIG. 7B shows a display pattern when the setting tab is set to plot the measurement data by a line. FIG. 7C shows a display pattern when the setting tab is set to plot the measurement data by dots connected by a line. Here, the number of measurement data to be plotted is restricted to the number of data set by the display data number setting tab. As shown in FIG. 7A, a number of measurement data corresponding to the set number are displayed from the old data to the new data. In addition, based on the setting values in the data display form setting tab, the dots or the line(s) are colored, and additionally or alternatively, gradations may be added to the display color, changing from the old data to the new data.

The processes of Steps SA91 to SA98 are repeated until all the X-Y, two-dimensional coordinate graphs set by the data type assignment section 63 are updated and displayed. When all the X-Y, two-dimensional coordinate systems are updated and displayed (SA99), the flow moves to Step SA10.

In this manner, until an operator inputs an end command, the operation unit 6 repeats the processes of Steps SA8 and SA9, the simulation calculation section 2 repeats the processes of Steps SB3 to SB6, and the signal measurement section 3 repeats the processes of Steps SC3 and SC4.

When the end command is input (SA10), the end command is transmitted from the model control unit 62 to the simulation calculation section 2 and the signal measurement section 3 (SA11). Upon receiving the end command, the simulation calculation section 2 and the signal measurement section 3 end the processes (SB7 and SC5).

As described above, the plotting processing section 64 as the data display section is for repeatedly performing display based on X-axis data and Y-axis data, which are respectively data regarding the X and Y axes, in the plotting area. The plotting processing section is configured to display a graphic on coordinates in the plotting area defined by a pair of the X-axis data and the Y-axis data that are paired in time. The plotting processing section is also configured to change a display pattern of the graphic to be displayed in the plotting area such that the display pattern gradually changes as a graphic of which the data for defining display coordinates are older in time becomes a graphic of which the data for defining display coordinates are newer in time.

Further, the data display section is for displaying, as the graphic to be displayed in the plotting area, a curve formed by connecting, among a plurality of coordinates defined by the data, adjacent coordinates of which the data for defining the coordinates are adjacent in time. The data display section is configured such that whenever display coordinates corresponding to new data are added, the adjacency between the display coordinates which constitute an existing curve is recalculated in accordance with the added display coordinates, thereby forming a new curve.

Next, the other embodiments will be described.

The data storage section of the operation unit 6 may be configured to store therein a plurality of types of comparison data files for comparing with the measurement data. Further, the data type assignment section 63 may be configured to assign the plural types of the comparison data stored in the data storage section to the different coordinate axes of the single coordinate system. In addition, the plotting processing section 64 may be configured to plot characteristic values specified by the comparison data synchronized at the measurement timing from the comparison data belonging to the data types.

By using an ideal standard data file or a past normal measurement data file as the comparison data file for comparison with the measurement data obtained through simulation, it becomes easy to determine whether the measurement data is normal or abnormal.

In such a case, by providing the above-described coordinate axis assignment menu with a measurement data assignment submenu and a comparison data assignment submenu, when the comparison data assignment submenu is selected, the types of the comparison data are assigned to X and Y axes in a manner similar to the case of assignment using the above-described coordinate axis assignment menu.

Figure 8B:
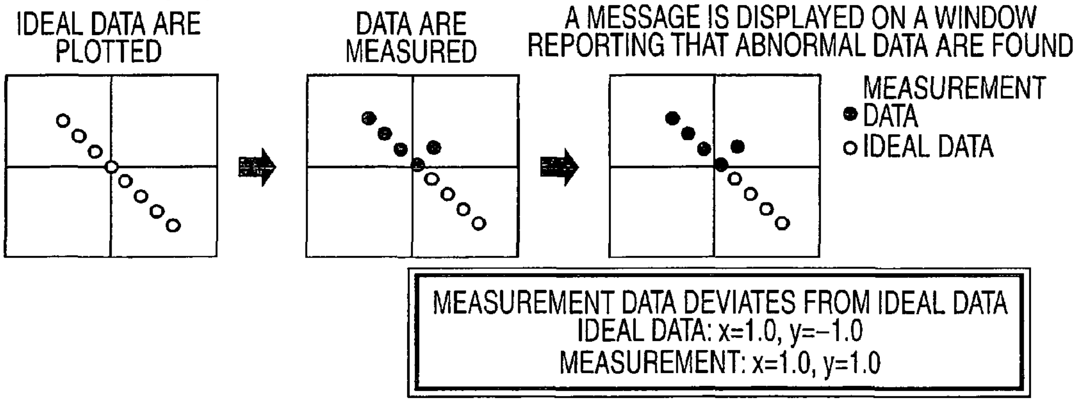

Further, in this case, by providing the plotting processing section 64 with an alarming section that displays a message or highlights some of the measurement data that are determined as being out of a predetermined tolerable error range from the comparison data, it is possible to further facilitate the simulation evaluation. Settings regarding whether or not to activate such an alarming section and the error range setting can be implemented by providing corresponding parameter setting tabs in the above-described parameter setting window. For example, as shown in FIG. 8B, ideal data are plotted as comparison data before the simulation starts and when some of the measurement data are out of the error range, the degree of deviation is displayed.

Figure 8C:
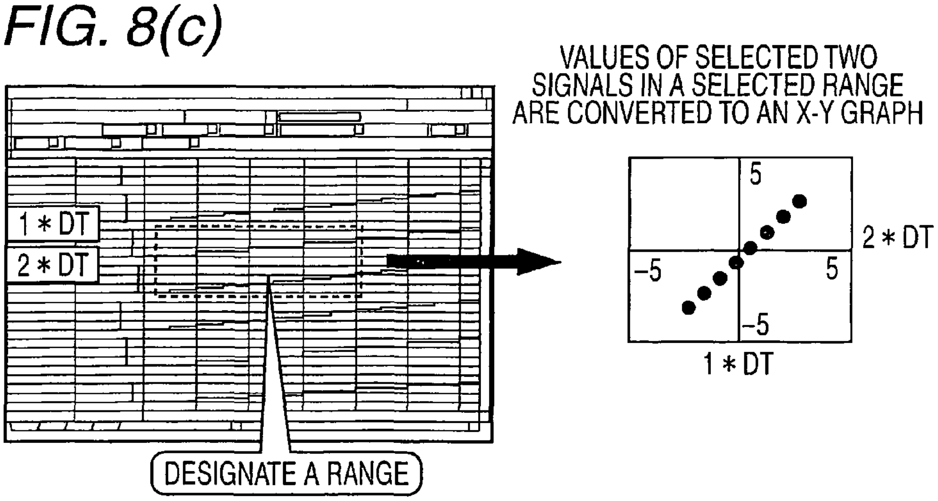

Further, in the above-described data type assignment process, a second plotting processing section may be employed which plots plural measurement data along a time axis, that is, outputting a graph as shown on the left side of FIG. 8C, in which plural measurement data are assigned to a timing chart, which is a time coordinate graph wherein X and Y axes are respectively assigned to time and measurement data. In this case, the data type assignment section 64 may be configured to assign the data type selected by a pointing device from the measurement data plotted by the second plotting processing section to a coordinate axis selected by the pointing device.

That is, data selection section may be provided for enabling a user to select data from the plural types of data displayed by the timing chart display section. In this case, the data display section is configured to perform the display using the type of the data selected by the data selection section as at least one of the X-axis data and the Y-axis data.

The data selection section is capable of selecting a time range of the timing chart displayed by the timing chart display section, and the data display section performs the display using data included in the time range selected by the data selection section as plotting data.

Specifically, in the graph on the left side of FIG. 8C, when an operator right-clicks a mouse on the data type display column, a conversion parameter setting section for conversion to an X-Y, two-dimensional coordinate system is activated and a menu for setting whether the data type will be assign to an X axis or a Y axis is displayed. For example, when the X axis is designated, the data type is assigned to the X axis.

When the X- and Y-axis assignment process is completed, an X-Y coordinate system is displayed adjacent to the time coordinate graph by the plotting processing section 64. Next, when an arbitrary block of the measurement data display area on the time coordinate graph is designated by a mouse operation of an operator, the measurement data belonging to the block are converted into data for display on the X-Y coordinate system as shown on the right side of FIG. 8C.

With such an arrangement, an operator can investigate, on the X-Y coordinate system, correlation between arbitrary data types displayed on the time coordinate graph.

It is noted that the term “graphic” as used in this specification and appended claims is used to include other graphics different from “dots” or “line” as described in the embodiments. Namely, in the present invention, the “graphic” includes “symbol” or “character” (such as displaying numeric data as characters).

As a method of gradually changing the display pattern of the graphic as described in the appended claims, the color of the graphic may be changed and the shape of a symbol may be gradually changed (for example, a circle is gradually changed to a rectangle).

As described in the appended claims, when generating an X-Y coordinate graph as shown in FIG. 8C, the X-Y coordinate graph may be generated using not only the data type selected from the timing chart but also the data within the time range selected in the timing chart. In this case, the X-Y coordinate graph may be generated using at least the data within the selected time range (that is, including data before and after the selected time range). Alternatively, the X-Y coordinate graph may be generated using only the data within the selected time range.

In the embodiment described above, the data display apparatus of the present invention has been described as being mounted on a simulation device that includes a simulation calculation section that conducts simulation on an engine operation for evaluation of an engine control unit mounted on a vehicle. However, the data display apparatus is not restricted to such an engine simulation device but can be mounted on other simulation devices.

Figure 6B:
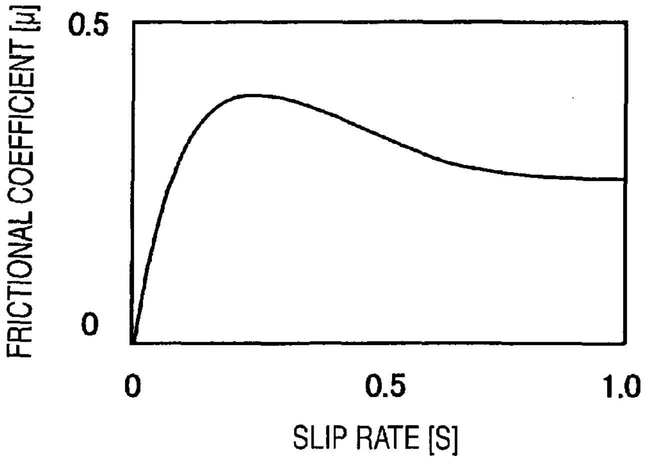
Figure 6C:
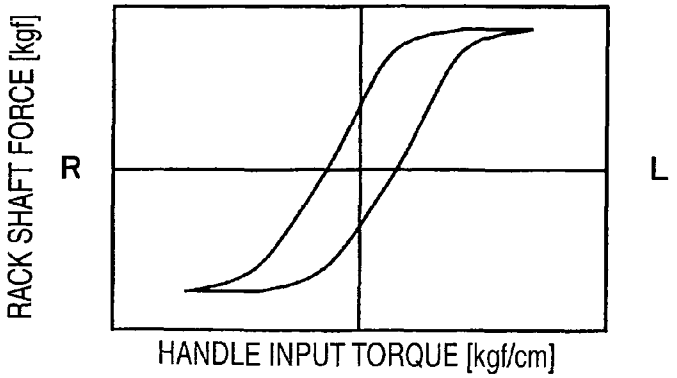

For example, when the data display apparatus is mounted on a simulation device having a simulation calculation section that conducts simulation on a brake operation for evaluation of a brake control unit as a vehicle control unit, the correlation between a slip rate of a vehicle and a frictional coefficient can be displayed on an X-Y, two-dimensional coordinate system as shown in FIG. 6B. In addition, when the data display apparatus is mounted on a simulation device having a simulation calculation section that conducts simulation on a steering operation for evaluation of a steering control unit as a vehicle control unit, the correlation between a handle input torque and a rack shaft force can be displayed on an X-Y, two-dimensional coordinate system as shown in FIG. 6C.

In the embodiment described above, the simulation calculation section and the signal measurement section have been described as being implemented as plural signal processing boards including the motherboard 5*a*, the input/output conversion boards 5*b*, and the signal relay boards 5*c*. However, specific configurations of the simulation calculation section and the signal measurement section are not restricted to this but they may be appropriately configured as long as the functions of the present invention can be provided, and for example may be constructed on a single signal processing board.

The embodiments described above are merely an exemplary embodiment for implementing the present invention. The specific configuration of each section, unit, or section can be appropriately changed in accordance with a built system as long as it can provide the same advantage as the present invention.

What is claimed is:

1. A data display apparatus for displaying a plurality of types of measurement data which are measured by a signal measurement section in a time serial manner on a predetermined coordinate system, the data display apparatus comprising:

a monitor operable to display the predetermined coordinate system on a screen thereof;

a processor; and a memory, the memory storing instruction which when executed cause the processor to perform as:

a data type assignment section operable to assign the types of the measurement data to different coordinate axes in the predetermined coordinate system, respectively based on an assignment operation;

a data input processing section operable to input thereto the measurement data belonging to the types; and a plotting processing section operable to plot characteristic values on the predetermined coordinate system on the screen of the monitor as graphics, the characteristic values specified by the measurement data synchronized at a measurement timing from the measurement data input to the data input processing section, to display a curve connecting the graphics corresponding to the characteristic values on the predetermined coordinate system on the screen of the monitor, wherein the plotting processing section plots a new characteristic value specified by the measurement data input to the data input processing section each time an updating time based on a predetermined updating period has come, updates the curve each time the new characteristic value is plotted and gradually updates and changes at least one of a shape and a color of each of the graphics as data for defining a display coordinate of each of the graphics gets newer in terms of time so as to add gradation changing from old data to new data to the graphics, and wherein the predetermined coordinate system has no time axis.

2. The data display apparatus as set forth in claim 1, further comprising a data storage section storing a plurality of types of comparison data for comparing with the measurement data, wherein the data type assignment section assigns the types of the comparison data stored in the data storage section to the different coordinate axes of the predetermined coordinate system; and wherein the plotting processing section plots characteristic values on the predetermined coordinate system, the characteristic values specified by the comparison data synchronized at the measurement timing from the comparison data belonging to the types, together with the characteristic values specified by the measurement data.

3. The data display apparatus as set forth in claim 1, further comprising a range switching section operable to switches a setting range of the predetermined coordinate system, wherein when one of the characteristic values is out of the setting range, the range switching section switches the setting range so as to include the one of the characteristic values on the predetermined coordinate system, automatically.

4. The data display apparatus as set forth in claim 1, further comprising a list display section operable to display a list of the types of the measurement data, wherein the data type assignment section assigns one of the data types, which is selected by a pointing device from the list displayed by the list display section to one of the coordinate axes on the predetermined coordinate system, which is selected by the pointing device.

5. The data display apparatus as set forth in claim 4, wherein when the data type assignment section assigns one of the data types to one of the coordinate axes, the list display section displays types of the measurement data which are correlated with the one of the data types as candidate types to be assigned to the other of the coordinate axes.

6. The data display apparatus as set forth in claim 1, further comprising a second plotting processing section operable to plot a plurality of measurement data along a time axis, wherein the data type assignment section assigns one of the data types, which is selected by a pointing device from the measurement data plotted by the second plotting processing section, to one of the coordinate axes on the predetermined coordinate system, which is selected by the pointing device.

7. The data display apparatus as set forth in claim 6, wherein the data type assignment section assigns measurement data which is included in a time range selected by a pointing device from the measurement data plotted by the second plotting processing section, to one of the coordinate axes on the predetermined coordinate system, which is selected by the pointing device.

8. The data display apparatus as set forth in claim 1, further comprising a simulation calculation section operable to output a simulated status signal to a control unit by simulating a vehicle, wherein the signal measurement section measures the simulated status signal or a control signal input from the control unit in response to the simulated status signal in a time serial manner to generate the measurement data.

9. The data display apparatus as set forth in claim 8, wherein the control unit is an engine electronic control unit.

10. The data display apparatus as set forth in claim 1, wherein the plotting processing section gradually changes the color of each of the graphics as the data for defining the display coordinate of each of the graphics gets newer in terms of time.

11. The data display apparatus as set forth in claim 1, wherein the plotting processing section gradually changes the shape of each of the graphics as the data for defining the display coordinate of each of the graphics gets newer in terms of time.

12. The data display apparatus as set forth in claim 1, wherein the predetermined coordinate system is a two-dimensional coordinate system having an X-axis and a Y-axis which are different from the time axis.

* * * * *